United States Patent [19]

Sugiyama et al.

[11] 4,435,101

[45] Mar. 6, 1984

[54] BALL JOINT

[75] Inventors: Minoru Sugiyama; Shinji Kaneko, both of Kanagawa, Japan

[73] Assignee: Tokico Ltd., Kawasaki, Japan

[21] Appl. No.: 333,615

[22] Filed: Dec. 22, 1981

[30] Foreign Application Priority Data

Dec. 29, 1980 [JP] Japan .......................... 55-191263[U]

[51] Int. Cl.³ ............................................. F16C 11/06
[52] U.S. Cl. .................................. 403/122; 156/73.1; 156/304.2; 403/141; 403/144
[58] Field of Search ...................... 156/70, 73.1, 304.2, 156/580.1, 580.2; 403/122, 141, 142, 143, 132, 144, 135; 228/110, 1 R

[56] References Cited

U.S. PATENT DOCUMENTS

| | | | |
|---|---|---|---|
| 3,256,051 | 6/1966 | Howe | 156/73.1 |
| 3,806,386 | 4/1974 | Burke et al. | 156/73.1 |
| 3,862,807 | 1/1975 | Doden et al. | 403/144 |
| 3,947,139 | 3/1976 | Feinbloom | 403/143 |
| 4,084,913 | 4/1978 | Schenk | 403/141 |
| 4,230,415 | 10/1980 | Scheerer | 403/122 |
| 4,241,463 | 12/1980 | Khovaylo | 403/143 |

FOREIGN PATENT DOCUMENTS 49-97155 10/1974 Japan .

*Primary Examiner*—Michael G. Wityshyn
*Attorney, Agent, or Firm*—Wenderoth, Lind & Ponack

[57] ABSTRACT

A ball joint including a ball member having a ball end, a socket member having a recess for pivotally receiving the ball end of the ball member and a retaining ring received in the recess of the socket member for retaining the ball end of the ball member in the recess. The socket member consists of at least two components of synthetic resin material, and the components are welded together by supersonic welding process.

5 Claims, 10 Drawing Figures

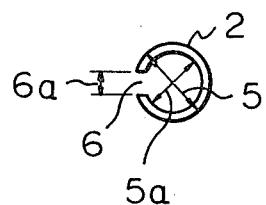
Fig. 6
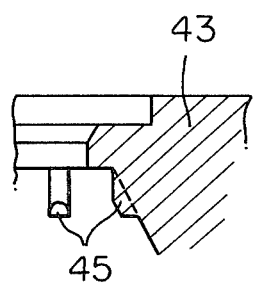
Fig. 7 PRIOR ART
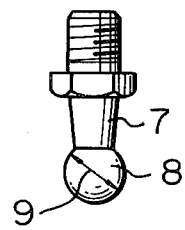
Fig. 8 PRIOR ART
Fig. 9 PRIOR ART
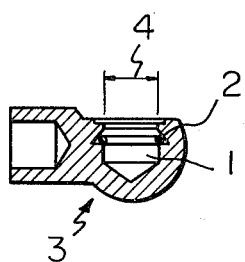
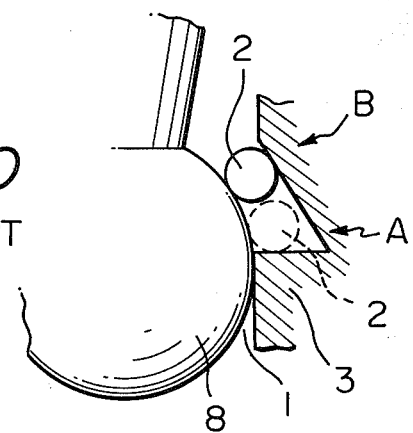
Fig. 10 PRIOR ART

BALL JOINT

BACKGROUND OF THE INVENTION

This invention relates to a ball joint including a ball member having a ball end and a socket member having a recess for pivotally receiving the ball end of the ball member.

Usually, the diameter of the opening of the recess is larger than that of the ball end of the ball member, and an annular retaining ring is fitted in the recess for preventing the ball end from escaping out. In its normal uncompressed condition, the outer diameter of the retaining ring is larger than the diameter of the opening of the recess and the inner diameter of the retaining ring is smaller than the diameter of the ball end so that the ball end is effectively retained in the recess. However, there has been provided a substantial amount of circumferential gap in the retaining ring so as to permit the retaining ring to be compressed with the diameter thereof being reduced in inserting the retaining ring into the recess. However, when the ball member is strongly pulled in the direction of escape from the recess, the retaining ring may sometimes be compressed in the direction which reduces the gap thereby reducing the diameter and allowing the ball member to escape from the recess. Thus, the prior art ball joint has a shortcoming that the connection between the ball member and the socket member is not reliable.

SUMMARY OF THE INVENTION

The present invention aims to solve the shortcoming aforementioned. According to the invention, the socket member of the ball joint consists of at least two components which are formed respectively of synthetic resin material and are welded together by a supersonic welding process. The supersonic welding process is performed with the ball member and the retaining ring assembled in the recess of the socket member. Preferably, the retaining ring does not have any substantial circumferential gap in the assembled condition.

One of the two components of the socket member may have an annular configuration with the inner diameter thereof defining the opening of the recess of the assembled socket member. Alternatively, the two components of the socket member may be welded together along a plane including the longitudinal or transverse central plane of the recess.

BRIEF DESCRIPTION OF THE DRAWINGS

Further objects and advantages of the invention will hereinafter be described with reference to the drawings, wherein:

FIG. 6 is an enlarged partial sectional view of the socket member of FIG. 5;

FIG. 7 is a sectional view showing a prior art socket member;

FIG. 8 is a plan view of a retaining ring incorporated in the socket member of FIG. 7;

FIG. 9 is a side view of a ball member; and

FIG. 10 is a schematic partial sectional view showing the movement of the ball member and the retaining ring relative to the socket member.

DETAILED DESCRIPTION OF THE PREFERRED EMBODIMENT

Figure 1:
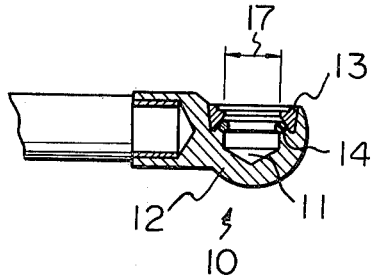
FIG. 1 is a longitudinal sectional view of a socket member of a ball joint according to the invention with a retaining ring being fitted therein.

FIGS. 7-8 show a typical prior art ball joint consisting of a socket member 3 having a recess 1 therein, a ball member 7 having a ball end 8 (FIG. 9) and an annular retaining ring 2 having a circumferential gap 6a. The ring 2 is fitted in the recess 1, however, since the diameter 4 of the opening of the recess 1 is smaller than the outer diameter 5 of the retaining 2, it has been required to compress the retaining ring 1 in inserting the ring 2 into the recess 1. The circumferential gap 6a of the ring 2 permits the ring 2 to be compressed. The inner diameter 5a of the ring 2 is, in the normal condition, smaller than the diameter 9 of the ball end of the ball member. In assembling the ball joint, the ring 2 is firstly fitted in the recess 1, and the ring 2 is expanded, in assembling the ball member with the socket member, so that the inner diameter 5a of the retaining ring expands to permit the ball end of the ball member to pass through the retaining ring.

When the ball end 8 tends to escape from the recess 1, the ring 2 moves from position A to position B as seen in FIG. 10 and engages with the wall of the recess 1 and the ball end 8 and, in the normal condition, the ring 2 maintains the circumferential gap 6a with the inner diameter 5a being smaller than the diameter 9 of the ball end 8 and the outer diameter 5 being larger than the diameter 4 of the opening in the recess 1, thus effectively retains the ball end 8 in the recess 1. However, there is a tendency that, according to the inclined surface in the recess 1, when the ball end 8 is strongly pulled, the ring 2 is compressed in the direction reducing the circumferential gap, and as the result, the outer diameter of the ring 2 decreases and the ball end 8 and the ring 2 escape from of the recess 1.

Figure 2:
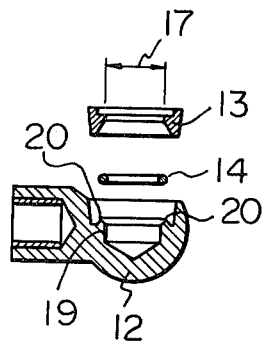
FIG. 2 is a cross-sectional exploded view of the socket member and retaining ring of FIG. 1.
Figure 3:
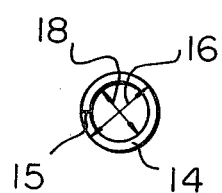
FIG. 3 is a plan view of the retaining ring of FIG. 1.

A preferred embodiment of the invention is shown in FIGS. 1-3. A socket member 10 shown in FIGS. 1 and 2 consists of a first or a main component 12 having a recess 14 and a second annular component 13 welded to the main component 12 by means of a supersonic welding process. The components 12 and 13 are formed of synthetic resin material such as glass fiber reinforced nylon or a mixture of polycarbonate and glass fiber. The ring 14 has a circumferential gap 15 the amount of which is substantially zero in the normal, unexpanded condition. The outer diameter 16 of the ring 14 is larger than the inner diameter 17 of the annular component 13 and the inner diameter 18 of the ring 14 is smaller than the diameter of a ball end of a ball member cooperating with the socket member 10. The ball member may be similar to the ball member 7 shown in FIG. 9. In assembling the ball member with the socket member 10 with the ring 14 being assembled as shown in FIG. 1, the ring 14 is expanded so as to pass the ball end of the ball member therethrough with the circumferential gap 15 being increased. When the ball end of the ball member has passed through the ring 14, the ring 14 contracts due to its resiliency.

According to the invention, the components 12 and 13 of the socket member 10 are then welded together by supersonic welding process. To aid the welding process, there is provided an annular projection 20 on an annular shoulder 19 of the first component 12 as shown in FIG. 2. The projection 20 firstly melts in the supersonic welding process and flows along the mating surfaces between the components 12 and 13. The two components are reliably and firmly welded together.

Figure 4:
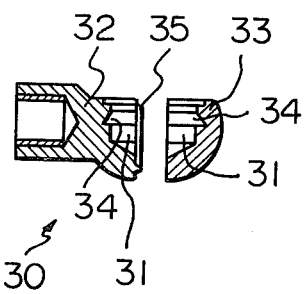
FIG. 4 is a cross-sectional exploded view of a socket member according to a second embodiment of the invention.

In the embodiment of FIGS. 1 and 2, the second component 13 of the socket member 10 constitutes a retaining portion defining the opening 17 of the recess 11. However, in the embodiment of FIG. 4, two components 32 and 33 of the socket member 30 are mated along a plane transverse the longitudinal axis of the socket member and passing through the center of the recess 31 which receives the ball end of the ball member. Similarly to the embodiment of FIG. 2, there is provided a semi-circular projection 35 on the mating surface of either of the components 32 and 33 so as to obtain a reliable welding between the components 32 and 33. FIG. 4 does not show any retaining ring, but it will be understood that a retaining ring similar to the retaining ring 14 is located in the annular portion depicted by the reference numeral 34 prior to the supersonic welding process. The diameter of the annular portion 34 permits the expansion of the retaining ring in inserting the ball end of a ball member into the recess 31 of the socket member 30.

Figure 5:
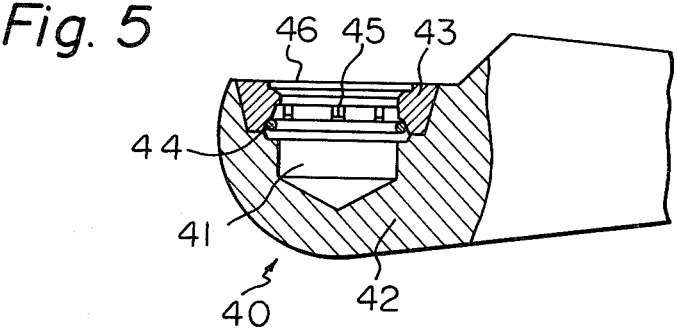
FIG. 5 is a longitudinal sectional view of a socket member according to a third embodiment of the invention.

FIGS. 5 and 6 show another embodiment of the invention. The socket member 40 shown in FIG. 5 consists, similar to the embodiment of FIGS. 1 and 2, of a first component 42 and an annular second component 43. The component 43 has a plurality of circumferentially spaced projections 45 on the inner circumference which engage with a retaining ring 44 to prevent the retaining ring from escaping out. Further, the space between the projections 45 can serve as a reservoir of lubricant such as grease.

In the embodiments, the recesses 1, 11, 31 and 41 are shown to have a generally cylindrical shape provided with a cone-like bottom, but the recess may have a spherical or part spherical form.

As described heretofore, according to the invention, the socket member of the ball joint is formed of at least two components which are formed of synthetic resin material and are welded together by a supersonic welding process. Thus, it is possible to utilize a retaining ring having a substantially zero gap, whereby the escape of the ball member can reliably be prevented. Since the socket member is formed of synthetic resin material, the fabrication process is easy and the costs can be reduced.

What is claimed is:

1. A ball joint including:

a ball member having a ball end;

a socket member comprising two components formed of synthetic resin material, having a recess therein for receiving said ball end of said ball member, said recess having a ring receiving portion at the upper end thereof; and an annular metal retaining ring having a split therein of normally zero gap received in said ring receiving portion of said recess, said ring being resiliently radially expandable, said gap widening during expansion of said ring, said ring in its unexpanded state having an inner diameter less than the diameter of said ball end;

said two components being supersonically welded together so as to irremovably hold said ring in said ring receiving portion, said ring receiving portion being shaped to permit said ring to radially expand to receive said ball end therethrough into said recess when said ball end is pushed downward thereon, and to block said ring from expanding when said ball end is pulled outward against said ring from within said recess, so as to block removal of said ball end from said recess.

2. A ball joint according to claim 1 wherein the socket member consists of a primary component having said recess for receiving the ball end of the ball member, and an annular retaining component supersonically welded on the primary component above said ring so as to block upward movement of said ring.

3. A ball joint according to claim 1 wherein the socket member consists of two components which are welded together along a plane which is perpendicular to the plane of the retaining ring and includes the center of the ball end of the ball member.

4. A ball joint as in claim 1, wherein said socket member has a circular opening whose diameter is at least as large as the diameter of said ball end and less than the outer diameter of said ring in its unexpanded state.

5. A ball joint as in claim 1, wherein said two components are welded along a weld line defining a substantially closed path of said dimensions that said ring member can be passed therethrough so that said ring can be inserted in said ring receiving portion before said two components are supersonically welded.

* * * * *